US010916177B2

(12) United States Patent
Kim et al.

(10) Patent No.: US 10,916,177 B2
(45) Date of Patent: Feb. 9, 2021

(54) DISPLAY APPARATUS HAVING A UNIT PIXEL COMPOSED OF FOUR SUB-PIXELS

(71) Applicant: LG Display Co., Ltd., Seoul (KR)

(72) Inventors: Young-Ho Kim, Goyang-si (KR); Il-Gi Jeong, Cheongju-si (KR); Ung-Gi Lee, Paju-si (KR); In-Cheol Park, Paju-si (KR); Ha-Na Jung, Seoul (KR); Dong-Woo Kim, Busan (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/714,168

(22) Filed: Dec. 13, 2019

(65) Prior Publication Data

US 2020/0211444 A1 Jul. 2, 2020

(30) Foreign Application Priority Data

Dec. 28, 2018 (KR) ........................ 10-2018-0172478

(51) Int. Cl.
*G06F 1/00* (2006.01)
*G09G 3/20* (2006.01)

(52) U.S. Cl.
CPC ... *G09G 3/2074* (2013.01); *G09G 2300/0452* (2013.01); *G09G 2310/0264* (2013.01); *G09G 2330/021* (2013.01)

(58) Field of Classification Search
None
See application file for complete search history.

(56) References Cited

U.S. PATENT DOCUMENTS

2014/0218655 A1* 8/2014 Jeong .................. G09G 3/3648 349/46
2017/0059948 A1* 3/2017 Namgung ............ G09G 3/2074

* cited by examiner

*Primary Examiner* — Michael A Faragalla
(74) *Attorney, Agent, or Firm* — Fenwick & West LLP

(57) ABSTRACT

A display apparatus in which each unit pixel includes four sub-pixels is provided. The four sub-pixels of each unit pixel may sequentially receive a data line through single data line. Two sub-pixels disposed on a side of the data line may be connected to a reference voltage supply line by a reference connecting line intersecting the data line. Two sub-pixels disposed another side of the data line may be connected to the data line by a data connection line intersecting the reference voltage supply line. An intersection region of the reference connection line and the data line may have the same area as an intersection region of the data connection line and the reference voltage supply line. Thus, in the display apparatus, the variation in the charging rate due to the parasitic capacitance difference of the data connection line and the reference connection line may be reduced.

14 Claims, 5 Drawing Sheets

DISPLAY APPARATUS HAVING A UNIT PIXEL COMPOSED OF FOUR SUB-PIXELS

CROSS-REFERENCE TO RELATED APPLICATIONS

This application claims the priority benefit of Republic of Korea Patent Application No. 10-2018-0172478, filed on Dec. 28, 2018, which is hereby incorporated by reference in its entirety.

BACKGROUND

Field of Technology

The present disclosure relates to a display apparatus in which a unit pixel composed of four sub-pixels is connected to single data line.

Discussion of the Related Art

Generally, an electronic appliance, such as a monitor, a TV, a laptop computer, and a digital camera includes a display apparatus to realize an image. For example, the display apparatus may include light-emitting devices.

The display apparatus may include a plurality of unit pixels. Each of the unit pixels may be composed of sub-pixels. Each of the sub-pixels may realize a color different from other sub-pixels. For example, each of the unit pixels may include a blue sub-pixel realizing blue color, a red sub-pixel realizing red color, a green sub-pixel realizing green color, and a white sub-pixel realizing white color.

Each of the unit pixels may receive a data signal through a single data line. For example, each data line may sequentially transmit the data signals to the four sub-pixels of each unit pixel. Each of the data lines may cross between the sub-pixels of the corresponding unit pixel. For example, each unit pixel may include a first sub-pixel and a second sub-pixel which are disposed side by side on a side of the corresponding data line, and a third sub-pixel and a fourth sub-pixel which are disposed side by side on another side of the corresponding data line.

However, since the four sub-pixels of each unit pixel receive the data signals through the single data line, the display apparatus may include at least one connection line for connecting each sub-pixel to the corresponding data line, and the parasitic capacitor of each sub-pixel may be different due to the connection line. Thus, in the display apparatus, the charging rate of each sub pixel may be different due to the variation of the parasitic capacitor, and a signal applied to a specific sub-pixel may be relatively delay.

SUMMARY

Accordingly, the present disclosure is directed to a display apparatus that substantially obviates one or more problems due to limitations and disadvantages of the related art.

An object of the present disclosure is to provide a display apparatus in which the sub-pixels of each unit pixel have the same charging rate.

Another object of the present disclosure is to provide a display apparatus capable of reducing RC delay difference in sub-pixels of each unit pixel.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a display apparatus including a first sub-pixel. A second sub-pixel is disposed side by side with a first sub-pixel in a first direction. A third sub-pixel is disposed side by side with the first sub-pixel in a second direction perpendicular to the first direction. A fourth sub-pixel is disposed side by side with the third sub-pixel in the first direction. A data line extends in the first direction. The data line crosses between the first sub-pixel and the third sub-pixel, and between the second sub-pixel and the fourth sub-pixel. A reference voltage supply line is disposed side by side with the data line. The reference voltage supply line crosses between the data line and the third sub-pixel, and between the data line and fourth sub-pixel. A reference connection line intersects the data line. The reference connection line connects the first sub-pixel and the second sub-pixel to the reference voltage supply line. A data connection line intersects the reference voltage supply line. The data connection line connecting the third sub-pixel and the fourth sub-pixel to the data line. An intersection region of the reference voltage supply line and the data connection line has the same area as an intersection region of the data line and the reference connection line.

The number of the intersection region of the reference voltage supply line and the data connection line may be the same as the number of the intersection region of the data line and the reference connection line.

The number of the intersection region of the data line and the reference connection line may be 1.

Gate lines may extend in the second direction. The gate lines may include a first gate line connected to the first sub-pixel, a second gate line connected to the second sub-pixel, a third gate line connected to the third sub-pixel, and a fourth gate line connected to the fourth sub-pixel. The second gate line may be disposed closer to the first gate line than the third gate line.

Each of the first to fourth sub-pixels may include a light-emitting device and a driving circuit electrically connected to the light-emitting device. The driving circuit of the third sub-pixel may have the same arrangement as the driving circuit of the first sub-pixel. The driving circuit of the fourth sub-pixel may have the same arrangement as the driving circuit of the second sub-pixel.

The driving circuit of the second sub-pixel may have an arrangement symmetrical with the driving circuit of the first sub-pixel.

The driving circuit of the first to fourth sub-pixels may include at least one transistor. A gate electrode of the transistor may have the same material as a source electrode and a drain electrode of the transistor.

The data line and the reference voltage supply line may have a material different from the gate electrode.

The data connection line and the reference connection line may have the same material as the gate electrode.

A power supply line may extend in the first direction. A power distribution line may be connected to the power supply line. The power distribution line may extend in the second direction. The power distribution line may cross the first to fourth sub-pixels.

BRIEF DESCRIPTION OF THE DRAWINGS

The accompanying drawings, which are included to provide a further understanding of the invention and are incorporated in and constitute a part of this application, illustrate embodiment(s) of the disclosure and together with the description serve to explain the principle of the invention. In the drawings.

DETAILED DESCRIPTION

Figure 1A:
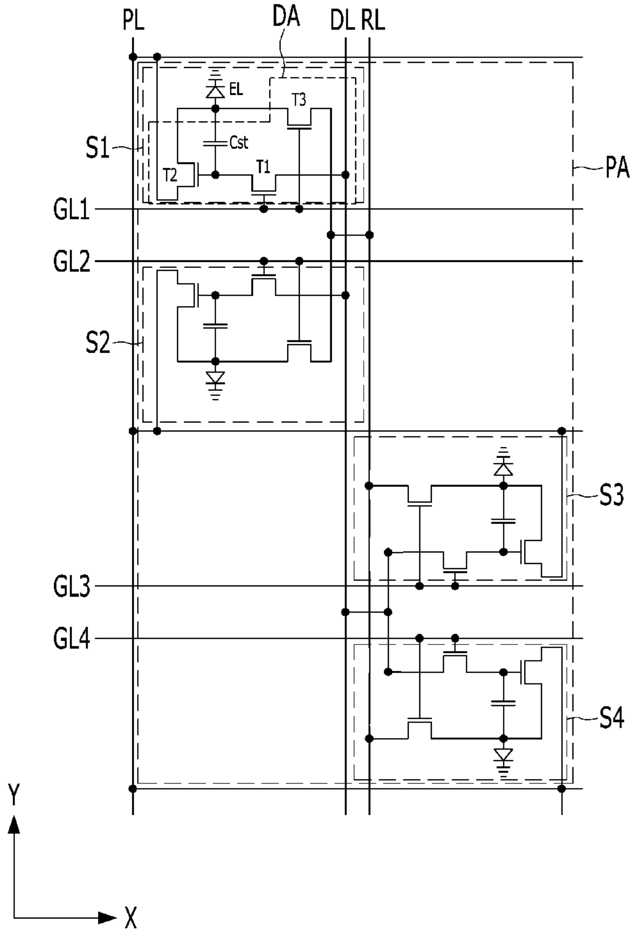
FIG. 1A is a view schematically showing a display apparatus according to an embodiment of the present disclosure.

Hereinafter, details related to the above objects, technical configurations, and operational effects of the embodiments of the present invention will be clearly understood by the following detailed description with reference to the drawings, which illustrate some embodiments of the present invention. Here, the embodiments of the present invention are provided in order to allow the technical sprit of the present invention to be satisfactorily transferred to those skilled in the art, and thus the present invention may be embodied in other forms and is not limited to the embodiments described below.

In addition, the same or extremely similar elements may be designated by the same reference numerals throughout the specification, and in the drawings, the lengths and thickness of layers and regions may be exaggerated for convenience. It will be understood that, when a first element is referred to as being "on" a second element, although the first element may be disposed on the second element so as to come into contact with the second element, a third element may be interposed between the first element and the second element.

Here, terms such as, for example, "first" and "second" may be used to distinguish any one element with another element. However, the first element and the second element may be arbitrary named according to the convenience of those skilled in the art without departing the technical sprit of the present invention.

The terms used in the specification of the present invention are merely used in order to describe particular embodiments, and are not intended to limit the scope of the present invention. For example, an element described in the singular form is intended to include a plurality of elements unless the context clearly indicates otherwise. In addition, in the specification of the present invention, it will be further understood that the terms "comprises" and "includes" specify the presence of stated features, integers, steps, operations, elements, components, and/or combinations thereof, but do not preclude the presence or addition of one or more other features, integers, steps, operations, elements, components, and/or combinations.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Embodiment

Figure 1B:
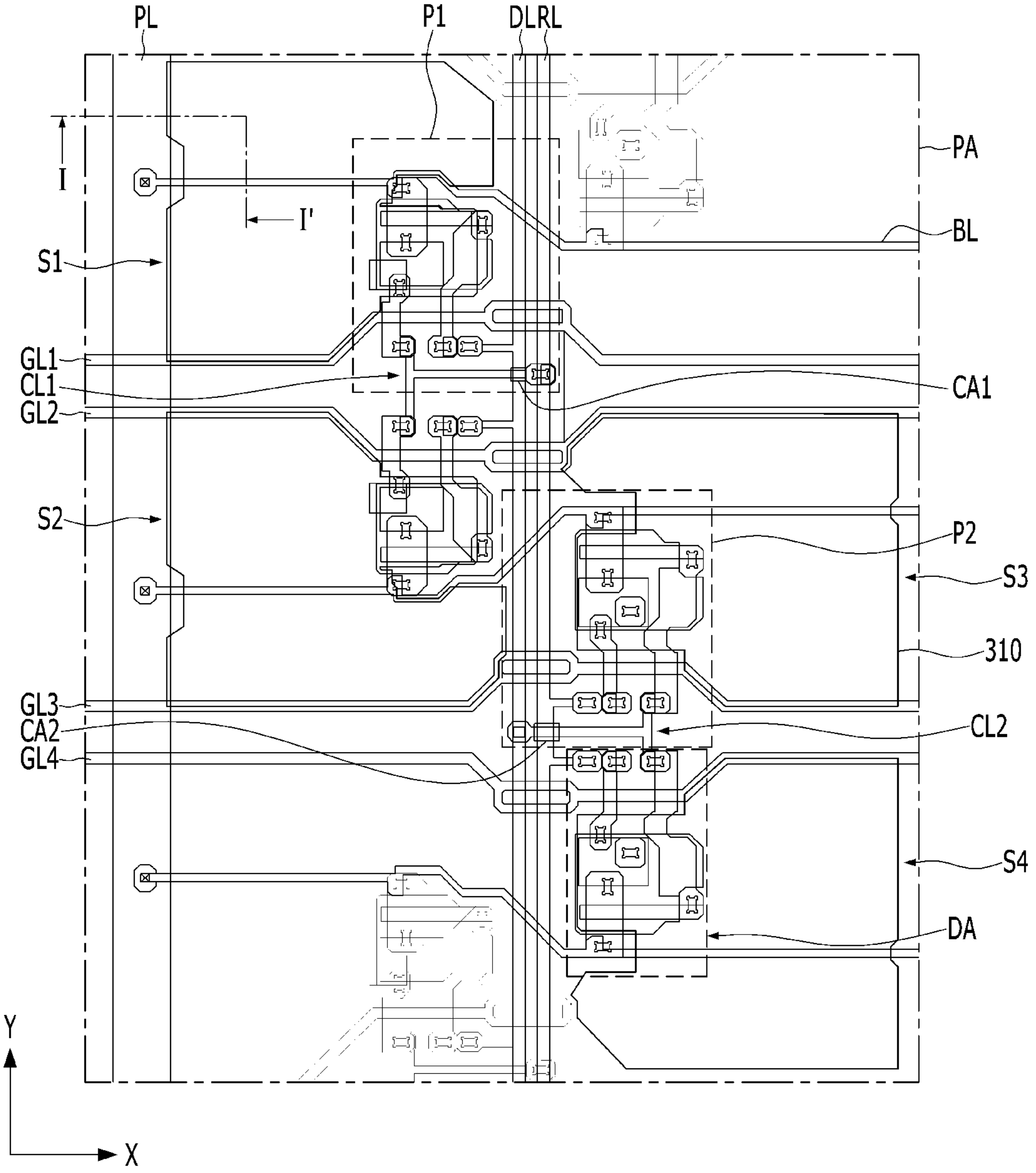
FIG. 1B is a view schematically showing an arrangement of sub-pixels composed of single unit pixel in the display apparatus according to the embodiment of the present disclosure.
Figure 2A:
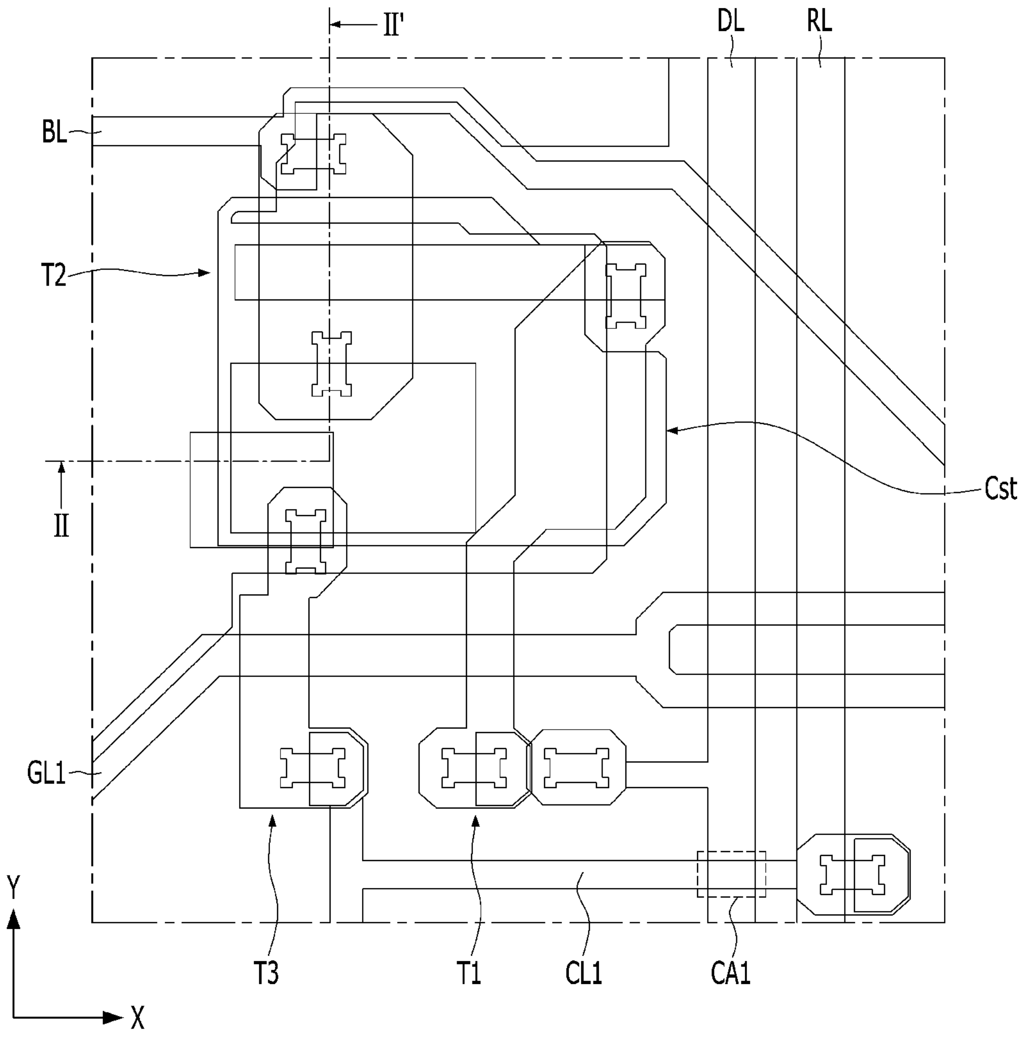
FIG. 2A is an enlarged view of region P1 in FIG. 1B according to the embodiment of the present disclosure.
Figure 2B:
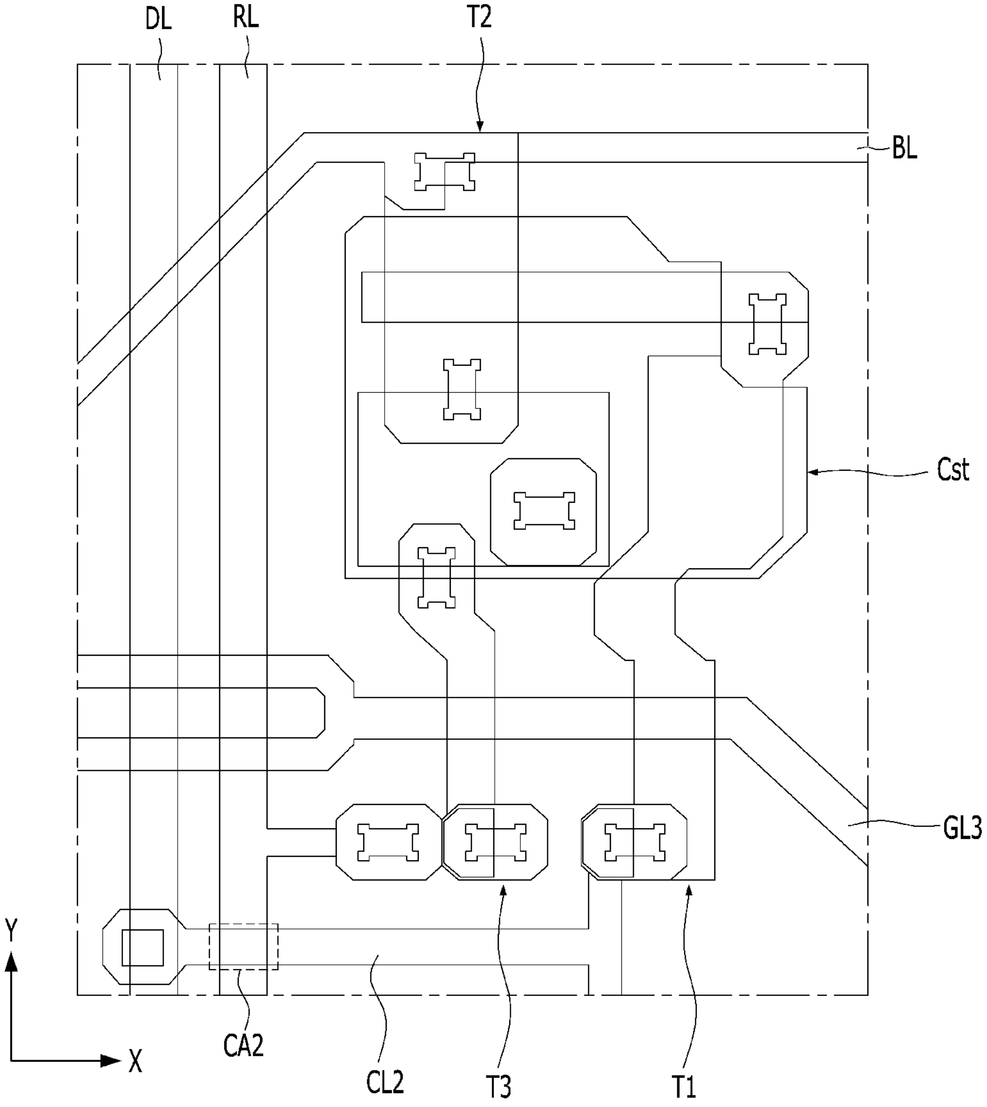
FIG. 2B is an enlarged view of region P2 in FIG. 1B.
Figure 3A:
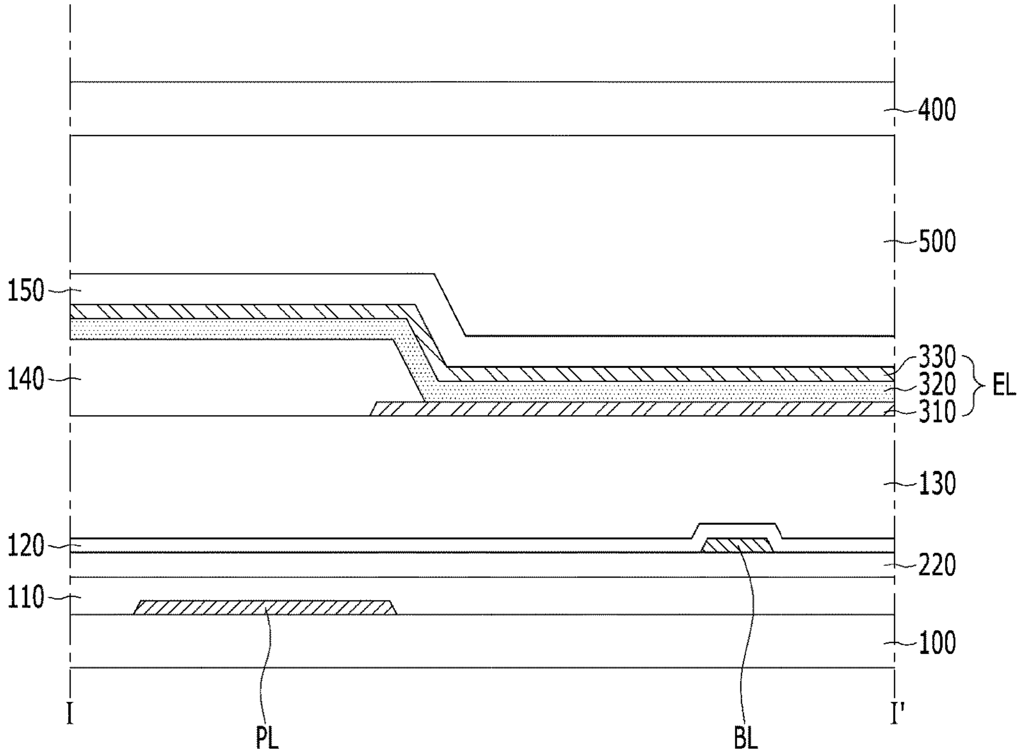
FIG. 3A is a view taken along a line I-I' of FIG. 1B according to the embodiment of the present disclosure.
Figure 3B:
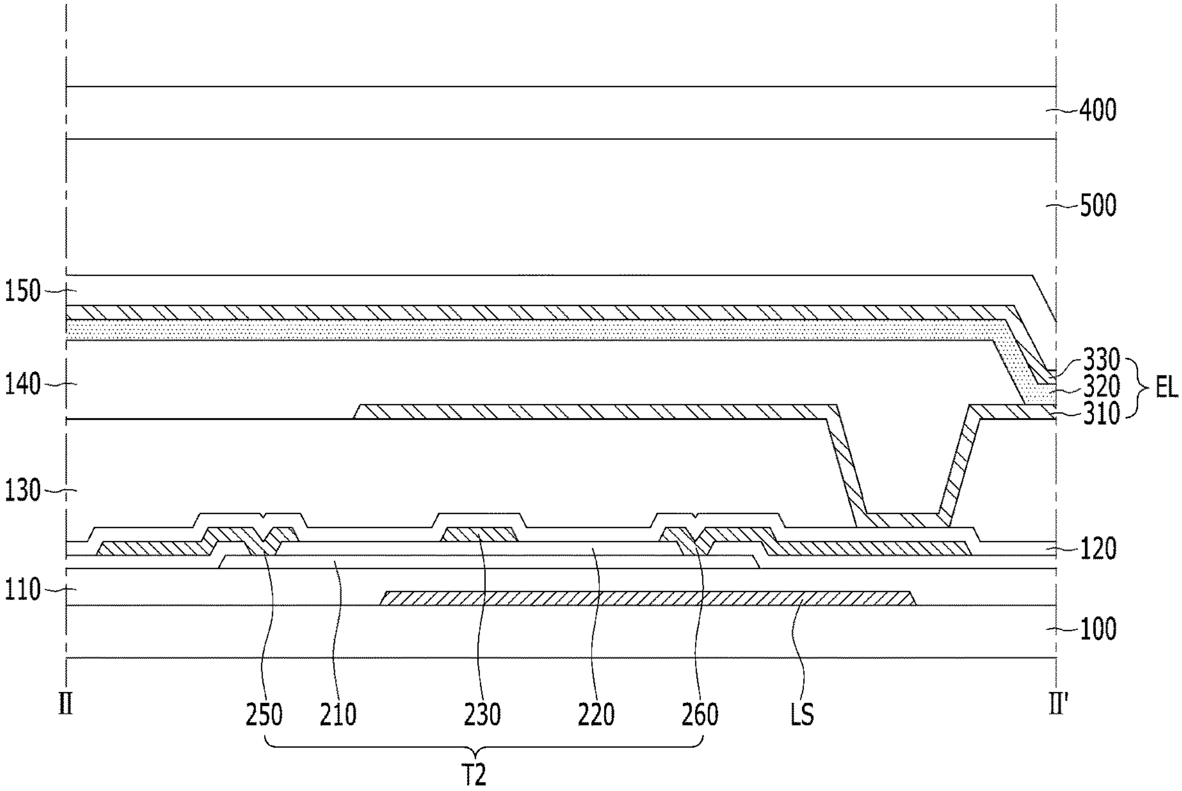
FIG. 3B is a view taken along a line II-II' of FIG. 2A according to the embodiment of the present disclosure.

FIG. 1A is a view schematically showing a display apparatus according to an embodiment of the present disclosure. FIG. 1B is a view schematically showing an arrangement of sub-pixels composing of single unit pixel in the display apparatus according to the embodiment of the present disclosure. FIG. 2A is an enlarged view of region P1 in FIG. 1B. FIG. 2B is an enlarged view of region P2 in FIG. 1B. FIG. 3A is a view taken along a line I-I' of FIG. 1B. FIG. 3B is a view taken along a line II-IP of FIG. 2A.

Referring to FIGS. 1A, 1B, 2A, 2B, 3A and 3B, the display apparatus according to the embodiment of the present disclosure may include a device substrate 100. The device substrate 100 may include an insulating material. The device substrate 100 may include a transparent material. For example, the device substrate 100 may include glass or plastic.

Signal lines GL1-GL4, DL, RL and PL may be disposed on the device substrate 100. For example, the signal lines GL1-GL4, DL, RL and PL may include gate lines GL1-GL4 to apply gate signal, a data line DL to transmit a data signal, a reference voltage supply line RL to supply a reference voltage, and a power supply line PL to supply a power voltage. The gate lines GL1-GL4 may intersect the data line DL. For example, the data line DL may extend in a first direction Y, and the gate lines GL1-GL4 may extend in a second direction X that is perpendicular to the first direction Y. The reference voltage supply line RL may be disposed side by side with the data line DL in the second direction X. For example, the reference voltage supply line RL may extend in the first direction Y. The power supply line PL may be parallel with the data line DL. For example, the power supply line PL may extend in the first direction Y.

The signal lines GL1-GL4, DL, RL and PL may control each unit pixel PA. Each of the unit pixels PA may be composed of four sub-pixels S1-S4. The four sub-pixels S1-S4 may share the data line DL and the reference voltage supply line RL. The data line DL and the reference voltage supply line RL may separate the four sub-pixels S1-S4 of each unit pixel PA to two group. For example, the data line DL and the reference voltage supply line RL may cross between a first sub-pixel S1 and a third sub-pixel S3, and between a second sub-pixel S2 and a fourth sub-pixel S4. The second sub-pixel S2 may be disposed side by side with the first sub-pixel S1 in the first direction Y. The third sub-pixel S3 may be disposed side by side with the first sub-pixel S1 in the second direction X. The fourth sub-pixel S4 may be disposed side by side with the third sub-pixel S3 in the first direction Y. The second sub-pixel S2 may be disposed side by side with the fourth sub-pixel S4 in the second direction X.

The gate lines GL1-GL4 may be connected to the sub-pixels S1-S4, respectively. For example, the gate lines GL1-GL4 may include a first gate line GL1 connected to the first sub-pixel S1, a second gate line GL2 connected to the second sub-pixel S2, a third gate line GL3 connected to the third sub-pixel S3, and a fourth gate line GL4 connected to the fourth sub-pixel S4.

Each of sub-pixels S1-S4 may include a light-emitting device EL and a driving circuit DA. The light-emitting device EL may be electrically connected the driving circuit DA. The driving circuit DA may be controlled by the signal lines GL1-GL4, DL, RL and PL. For example, the driving circuit DA of the first sub-pixel S1 may be connected to the first gate line GL1, the driving circuit DA of the second sub-pixel S2 may be connected to the second gate line GL2, the driving circuit DA of the third sub-pixel S3 may be connected to the third gate line GL3, and the driving circuit DA of the fourth sub-pixel S4 may be connected to the fourth gate line GL4. The driving circuit DA may supply the driving current according to the gate signal and the data signal to the light-emitting device EL. For example, the driving circuit DA may include a first thin film transistor T1, a second thin film transistor T2, a third thin film transistor T3, and a storage capacitor Cst.

The first thin film transistor T1 may be controlled by the gate signal applied through the corresponding gate line GL1-GL4. The first thin film transistor T1 may transmit the data signal applied through the data line DL according to the gate signal. For example, the first thin film transistor T1 may include a semiconductor pattern 210, a gate insulating layer 220, a gate electrode 230, a source electrode 250 and a drain electrode 260.

The semiconductor pattern 210 may be disposed close to the device substrate 100. The semiconductor pattern 210 may include a semiconductor material. For example, the semiconductor pattern 210 may include amorphous silicon or a poly-silicon. The semiconductor pattern 210 may be oxide semiconductor. For example, the semiconductor pattern 210 may include IGZO.

The semiconductor pattern 210 may include a source region, a drain region and a channel region. The channel region may be disposed between the source region and the drain region. The channel region may have an electrical conductivity lower than the source region and the drain region. For example, the source region and the drain region may have impurity concentration higher than the channel region.

The gate insulating layer 220 may be disposed on the semiconductor pattern 210. The gate insulating layer 220 may extend beyond the semiconductor pattern 210. For example, a side surface of the semiconductor pattern 210 may be covered by the gate insulating layer 220.

The gate insulating layer 220 may include an insulating material. For example, the gate insulating layer 220 may include silicon oxide (SiO) and/or silicon nitride (SiN). The gate insulating layer 220 may have a multi-layer structure. The gate insulating layer 220 may include High-K material. For example, the gate insulating layer 220 may include hafnium oxide (HfO) or titanium oxide (TiO).

The gate electrode 230 may be disposed on the gate insulating layer 220. The gate electrode 230 may overlap the channel region of the semiconductor pattern 210. For example, the gate electrode 230 may be insulated from the semiconductor pattern 210 by the gate insulating layer 220.

The gate electrode 230 may include a conductive material. For example, the gate electrode 230 may include a metal, such as aluminum (Al), chrome (Cr), molybdenum (Mo) or tungsten (W).

The source electrode 250 may be disposed on the gate insulating layer 220. The source electrode 250 may be spaced away from the gate electrode 230. The source electrode 250 may be electrically connected to the source region of the semiconductor pattern 210. For example, the gate insulating layer 220 may include a contact hole partially exposing the source region of the semiconductor pattern 210. The source electrode 250 may be in contact with the source region of the semiconductor pattern 210 exposed by the gate insulating layer 220.

The source electrode 250 may include a conductive material. For example, the source electrode 250 may include a metal, such as aluminum (Al), chrome (Cr), molybdenum (Mo) or tungsten (W). The source electrode 250 may include the same material as the gate electrode 230.

The drain electrode 260 may be disposed on the gate insulating layer 220. The drain electrode 260 may be spaced away from the gate electrode 230 and the source electrode 250. The drain electrode 260 may be electrically connected to the drain region of the semiconductor pattern 210. For example, the gate insulating layer 220 may include a contact hole partially exposing the drain region of the semiconductor pattern 210. The drain electrode 260 may be in contact with the drain region of the semiconductor pattern 210 exposed by the gate insulating layer 220.

The drain electrode 260 may include a conductive material. For example, the drain electrode 260 may include a metal, such as aluminum (Al), chrome (Cr), molybdenum (Mo) and tungsten (W). The drain electrode 260 may include the same material as the source electrode 250.

The second thin film transistor T2 may be controlled by the first thin film transistor T1. For example, the first thin film transistor T1 may transmit the data signal to the second thin film transistor T2 according to the gate signal. The second thin film transistor T2 may transmit the driving current corresponding to the data signal to the light-emitting device EL. The second thin film transistor T2 may have the same structure as the first thin film transistor T1. For example, the second thin film transistor T2 may include the semiconductor pattern 210, the gate insulating layer 220, the gate electrode 230, the source electrode 250 and the drain electrode 260. The gate electrode 230 of the second thin film transistor T2 may include the same material as the source electrode 250 and the drain electrode 260 of the second thin film transistor T2.

The gate electrode 230 of the second thin film transistor T2 may be connected to the first thin film transistor T1. For example, the gate electrode 230 of the first thin film transistor T1 may be electrically connected to one of the gate lines GL1-GL4, the source electrode 250 of the first thin film transistor T1 may be electrically connected to the data line DL, and the drain electrode 260 of the first thin film transistor T1 may be electrically connected to the gate electrode 230 of the second thin film transistor T2.

The light-emitting device EL may receive the driving current according to the data line from the second thin film transistor T2. The second thin film transistor T2 may selectively connect between the light-emitting device EL and the power supply line PL. For example, the second thin film transistor T2 may be disposed between the light-emitting device EL and a power distribution line BL connected to the power supply line PL. The second thin film transistor T2 may include the source electrode 250 electrically connected to the power distribution line BL, and the drain electrode 260 electrically connected to the light-emitting device EL. As shown in FIG. 3A, the power supply line PL may be disposed on the device substrate, and the power distribution line BL may be disposed on the same gate insulating layer 220 as the gate electrode 230, which is different from the power supply line PL. Thus, the power distribution line BL may be made of a same material as the gate electrode 230.

The third thin film transistor T3 may be controlled by the gate signal. For example, the third thin film transistor T3 may transmit the reference voltage applied through the reference voltage supply line RL according to the gate signal. The third thin film transistor T3 may have the same structure as the first thin film transistor T1. For example, the third thin film transistor T3 may include the semiconductor pattern 210, the gate insulating layer 220, the gate electrode 230, the source electrode 250 and the drain electrode 260. The gate electrode 230 of the third thin film transistor T3 may include the same material as the source electrode 250 and the drain electrode 260 of the third thin film transistor T3.

The storage capacitor Cst may be maintain the signal applied to the gate electrode 230 of the second thin film transistor TR2 during a single frame. The storage capacitor Cst may be disposed between the gate electrode 230 and the drain electrode 260 of the second thin film transistor T2.

The data line DL may be disposed between the first sub-pixel S1 and the reference voltage supply line RL, and between the second sub-pixel S2 and the reference voltage supply line RL. Thus, in the display apparatus according to the embodiment of the present disclosure, the driving circuits DA of the first sub-pixel S1 and the second sub-pixel S2 may be connected to the reference voltage supply line RL by a reference connection line CL1 intersecting the data line DL. For example, the third thin film transistors T3 of the first sub-pixel S1 and the second sub-pixel S2 may include the source electrode 250 connected to the reference connection line CL1, respectively.

The reference voltage supply line RL may be disposed between the third sub-pixel S3 and the data line DL, and between the fourth sub-pixel S4 and the data line DL. Thus, in the display apparatus according to the embodiment of the present invention, the driving circuits DA of the third sub-pixel S3 and the fourth sub-pixel S4 may be connected to the data line DL by a data connection line CL2 intersecting the reference voltage supply line RL. For example, the first thin film transistors T1 of the third sub-pixel S3 and the fourth sub-pixel S4 may include the source electrode 250 connected to the data connection line CL2, respectively.

An intersection region CA2 of the reference voltage supply line RL and the data connection line CL2 may have the same area as an intersection region CA1 of the data line DL and the reference connection line CL1. For example, when the data line DL may have the same horizontal width as the reference voltage supply line RL, and the data connection line CL2 may have the same horizontal width as the reference connection line CL1, the number of the intersection region CA2 of the reference voltage supply line RL and the data connection line CL2 may be the same as the number of the intersection region CA1 of the data line DL and the reference connection line CL1. Thus, in the display apparatus according to the embodiment of the present disclosure, the variation in the charging rate of the first to fourth sub-pixels S1-S4 due to the reference connection line CL1 and the data connection line CL2 may be prevented.

In the display apparatus according to the embodiment of the present disclosure, the intersection region CA1 of the data line DL and the reference connection line CL1 and the intersection region CA2 of the reference voltage supply line RL and the data connection line CL2 may be reduced. For example, the number of the intersection region CA1 of the data line DL and the reference connecting line CL1 may be 1. The reference connection line CL1 may be branched toward the first sub-pixel S1 and the second sub-pixel S2 after intersecting the data line DL. For example, the number of the intersection region CA2 of the data connection line CL2 and the reference voltage supply line RL may be 1. The data connection line CL2 may be branched toward the third sub-pixel S3 and the fourth sub-pixel S4 after intersecting the reference voltage supply line RL. Thus, in the display apparatus according to the embodiment of the present disclosure, the parasitic capacitance of the reference connection line CL1 and the parasitic capacitance of the parasitic capacitance of the data connection line CL2 may be reduced. Therefore, in the display apparatus according to the embodiment of the present disclosure, the first to fourth sub-pixels S1-S4 may have the same the RC delay.

The driving circuit DA of the third sub-pixel S3 may have the same arrangement (e.g., a same layout) as the driving circuit DA of the first sub-pixel S1. For example, the driving circuit DA of the first sub-pixel S1 may include the first thin film transistor T1 between the third thin film transistor T3 and the data line DL, and the driving circuit DA of the third sub-pixel S3 may include the third thin film transistor T3 between the reference voltage supply line RL and the first thin film transistor T1. The driving circuit DA of the second sub-pixel S2 may have an arrangement symmetrical with the driving circuit DA of the first sub-pixel S1, and the driving circuit DA of the fourth sub-pixel S4 may have an arrangement symmetrical with the driving circuit DA of the third sub-pixel S3. For example, the driving circuit DA of the fourth sub-pixel S4 may have the same arrangement as the driving circuit DA of the second sub-pixel S2. Thus, in the display apparatus according to the embodiment of the present disclosure, the reference connection line CL1 may cross between the first thin film transistors T1 of the first sub-pixel S1 and the second sub-pixel S2, and the data connection line CL2 may cross the third thin film transistors T3 of the third sub-pixel S3 and the fourth sub-pixel S4. Therefore, in the display apparatus according to the embodiment of the present disclosure, the reference connection line CL1 and the data connection line CL2 may be simplified. For example, in the display apparatus according to the embodiment of the present disclosure, the shape of the reference connection line CL1 and the data connection line CL2 before branching may be a straight line.

A buffer layer 110 may be disposed between the device substrate 100 and the driving circuits DA of each sub-pixel S1-S4. The buffer layer 110 may reduce pollution due to the device substrate 100 in the process of forming the driving circuits DA. The buffer layer 110 may cover the entire surface of the device substrate 100. For example, the buffer layer 110 between the device substrate 100 and the driving circuit DA of the first sub-pixel S1 may be combined with the buffer layer 110 between the device substrate 100 and the driving circuit DA of the third sub-pixel S3.

The buffer layer 110 may include an insulating material. The buffer layer 110 may include an inorganic insulating material. For example, the buffer layer 110 may include silicon oxide (SiO) and/or silicon nitride (SiN). The buffer layer 110 may have a multi-layer structure.

A lower passivation layer 120 and an over-coat layer 130 may be sequentially stacked on the driving circuit DA. The lower passivation layer 120 may reduce the damage of the driving circuit DA due to the external moisture and impact. For example, the first to third thin film transistors T1-T3 and the storage capacitor Cst of the driving circuit DA may be covered by the lower passivation layer 120. The over-coat layer 130 may remove a thickness difference due to the driving circuit DA. For example, a surface of the over-coat layer 130 opposite to the device substrate 100 may be a flat surface.

The light-emitting device EL may be disposed on the over-coat layer 130. For example, the lower passivation layer 120 and the over-coat layer 130 may expose at least a portion of the drain electrode 260 of the second thin film transistor T2. For example, the lower passivation layer 120 may include lower contact hole partially exposing the drain electrode 260 of the second thin film transistor T2, and the over-coat layer 130 may include over contact hole overlapping with the lower contact hole. The light-emitting device EL may be connected to the driving circuit DA through the lower contact hole and the over contact hole.

The light-emitting device EL may emit light displaying a specific color. For example, the light-emitting device EL may include a first electrode 310, a light-emitting layer 320, and a second electrode 330, which are sequentially stacked.

The first electrode 310 may include a conductive material. The first electrode 310 may include a transparent material. For example, the first electrode 310 may be a transparent electrode formed of a transparent conductive material, such as ITO and IZO.

The light-emitting layer 320 may generate light having luminance corresponding to a voltage difference between the first electrode 310 and the second electrode 330. For example, the light-emitting layer 320 may include an emission material layer (EML) having an emission material. The emission material may be an organic material. For example, the display apparatus according to the embodiment of the present disclosure is an organic light-emitting display device having the light-emitting layer 320 formed of an organic material.

The second electrode 330 may include a conductive material. The second electrode 330 may include a material different from the first electrode 310. The second electrode 330 may have a reflectance higher than a reflectance of the first electrode 310. For example, the second electrode 330 may include a metal, such as aluminum (Al) and silver (Ag). Thus, in the display apparatus according to the embodiment of the present disclosure, the light generated by the light-emitting layer 320 may be emitted to outside through the device substrate 100 and the first electrode 310. However, the present disclosure is not limited thereto. When the display apparatus is a bottom-emission type display device, the first electrode 310 may include a transparent conductive material, and the second electrode 330 may include a reflective conductive material.

The light-emitting device EL of each sub-pixel S1-S4 may be independently driven. For example, the first electrode 310 of the light-emitting device EL of each sub-pixel S1-S4 may be spaced away from the first electrode 310 of the light-emitting device EL of adjacent sub-pixel S1-S4. A bank insulating layer 140 may be disposed in a space between adjacent first electrodes 310. Each of the first electrodes 310 may be insulated from adjacent first electrode 310 by the bank insulating layer 140. For example, the bank insulating layer 140 may cover an edge of each first electrode 310. The light-emitting layer 320 and the second electrode 330 of the light-emitting device EL may be stacked on a portion of the corresponding first electrode 310 exposed by the bank insulating layer 140. The light-emitting layer 320 and the second electrode 330 of the light-emitting device EL may extend onto the bank insulating layer 140. For example, the light-emitting layer 320 and the second electrode 330 of the light-emitting device EL of each sub-pixel S1-S4 may be combined with the light-emitting layer 320 and the second electrode 330 of the light-emitting device EL of adjacent sub-pixel S1-S4. The electrically connection region of the first electrodes 310 and the driving circuit DA may overlap the bank insulating layer 140. For example, the lower contact hole and the over contact hole may be disposed between the device substrate 100 and the bank insulating layer 140. In addition, a light shielding layer LS may be further disposed under the semiconductor pattern 210 of the second thin film transistor T2 to block the external light into the semiconductor pattern 210.

An upper passivation layer 150 may be disposed on the light-emitting device EL. The upper passivation layer 150 may reduce the damage of the light-emitting device EL due to the external moisture and impact. The upper passivation layer 150 may extend along the second electrode 330. For example, the upper passivation layer 150 may extend onto the bank insulating layer 140.

The upper passivation layer 150 may include an insulating material. For example, the upper passivation layer 150 may include an inorganic insulating material, such as silicon oxide (SiO) and silicon nitride (SiN). The upper passivation layer 150 may have a multi-layer structure. For example, the upper passivation layer 150 may have a structure in which an organic layer formed of an organic insulating material may be disposed between inorganic layers formed of an inorganic insulating material.

An encapsulation substrate 400 may be disposed on the upper passivation layer 150. The encapsulation substrate 400 may include an insulating material. The encapsulation substrate 400 may include a material different from the device substrate 100. For example, the encapsulation substrate 400 may include a metal having higher heat dissipation characteristics, such as aluminum (Al) and nickel (Ni), than the device substrate 100.

An adhesive layer 500 may be disposed between the device substrate 100 and the encapsulation substrate 400. The adhesive layer 500 may include an adhesive material. For example, the encapsulation substrate 400 may be combined with the device substrate 100 in which the light-emitting devices EL is formed, by the adhesive layer 500.

Accordingly, the display apparatus according to the embodiment of the present disclosure may include the unit pixel PA composed of the first to fourth sub-pixels S1-S4 which are separated to two group by the data line DL and the reference voltage supply line RL, and connection lines CL1 and CL2 for apply the data signal and the reference voltage to four sub-pixels S1-S4. The connection lines CL1 and CL2 may include the reference connection line CL1 intersecting the data line DL, and the data connection lien CL2 intersecting the reference voltage supply line RL. The intersection region CA1 of the reference connection line CL1 and the data line DL may have the same area as the intersection region CA2 of the data connection line CL2 and the reference voltage supply line RL. Thus, in the display apparatus according to the embodiment of the present disclosure, the variation in the charging rate of the first to fourth sub-pixels S1-S4 due to the connection lines CL1 and CL2 may be reduced. Therefore, in the display apparatus according to the embodiment of the present disclosure, the reliability of the operation of each unit pixel PA may be improved.

In the display apparatus according to the embodiment of the present disclosure, the driving circuits DA of the sub-pixels S1-S4 which are disposed on a side of the data line DL and the reference voltage supply line RL may have the same arrangement as the driving circuits DA of the sub-pixels S1-S4 which are disposed on another side of the data line DL and the reference voltage supply line RL. Thus, the number of the intersection region CA1 of the data line DL and the reference connection line CL1 and the number of the intersection region CA2 of the reference voltage supply line RL and the data connection line CL2 may be reduced. For example, the number of the intersection region CA1 of the data line DL and the reference connection line CL1, and the number of the intersection region CA2 of the reference voltage supply line RL and the data connection line CL2 may be 1. Therefore, in the display apparatus according to the embodiment of the present disclosure, the parasitic capacitance of each connection line CL1 and CL2 may be reduced. Also, in the display apparatus according to the embodiment of the present disclosure, the RC delay of the first to fourth sub-pixels S1-S4 may be reduced, so that the driving efficiency may be improved.

In the display apparatus according to the embodiment of the present disclosure, the shape of the connection lines CL1 and CL2 may be simplified. Thus, in the display apparatus according to the embodiment of the present disclosure, the arrangement of the connection lines CL1 and CL2 may be simplified. Therefore, in the display apparatus according to the embodiment of the present disclosure, the process of forming the driving circuits DA of the unit pixel PA may be simplified.

In the display apparatus according to the embodiment of the present disclosure, the thin film transistors T1-T3 of each driving circuit DA may include the source electrode 250 and the drain electrode 260 formed of the same material as the gate electrode 230. Thus, the number of stacked metal layer for forming the driving circuit DA of each sub-pixel S1-S4 may be reduced. Therefore, in the display apparatus according to the embodiment of the present invention, the process efficiency may be improved.

In the result, the display apparatus according to the embodiments of the present disclosure may include connection lines for supplying the data signal and the reference voltage to the sub-pixels of single unit pixel which are separated to two group by the data line and the reference voltage supply line, wherein the parasitic capacitance by the reference connection line intersecting the data line is the same as the parasitic capacitance by the data connection line intersecting the reference voltage supply line. Thus, in the display apparatus according to the embodiments of the present disclosure, the sub-pixels composing of single unit pixel may have the same charging rate. Therefore, in the display apparatus according to the embodiments of the present disclosure, the relative delay of the signal applied to a specific sub-pixel may be reduced.

What is claimed is:

1. A display apparatus comprising:
- a first sub-pixel;
- a second sub-pixel disposed side by side with the first sub-pixel in a first direction;
- a third sub-pixel disposed side by side with the first sub-pixel in a second direction perpendicular to the first direction;
- a fourth sub-pixel disposed side by side with the third sub-pixel in the first direction;
- a data line extending in the first direction, the data line crossing between the first sub-pixel and the third sub-pixel, and between the second sub-pixel and the fourth sub-pixel;
- a reference voltage supply line disposed side by side with the data line, the reference voltage supply line crossing between the data line and the third sub-pixel, and between the data line and fourth sub-pixel;
- a reference connection line intersecting the data line, the reference connection line connecting the first sub-pixel and the second sub-pixel to the reference voltage supply line; and
- a data connection line intersecting the reference voltage supply line, the data connection line connecting the third sub-pixel and the fourth sub-pixel to the data line,
- wherein the first to fourth sub-pixels are connected to the same data line and the same reference voltage supply line, and
- wherein an intersection region of the reference voltage supply line and the data connection line has a same area as an intersection region of the data line and the reference connection line.

2. The display apparatus according to claim 1, wherein a number of the intersection region of the reference voltage supply line and the data connection line is the same as a number of the intersection region of the data line and the reference connection line.

3. The display apparatus according to claim 2, wherein the number of the intersection region of the data line and the reference connection line is 1.

4. The display apparatus according to claim 1, further comprising gate lines extending the second direction,
- wherein the gate lines include a first gate line connected to the first sub-pixel, a second gate line connected to the second sub-pixel, a third gate line connected to the third sub-pixel, and a fourth gate line connected to the fourth sub-pixel, and
- wherein the second gate line is disposed closer to the first gate line than the third gate line.

5. The display apparatus according to claim 1, wherein each of the first to fourth sub-pixels includes a light-emitting device and a driving circuit electrically connected to the light-emitting device, and
- wherein the driving circuit of the third sub-pixel has the same arrangement as the driving circuit of the first sub-pixel, and the driving circuit of the fourth sub-pixel has the same arrangement as the driving circuit of the second sub-pixel.

6. The display apparatus according to claim 5, wherein the driving circuit of the second sub-pixel has an arrangement symmetrical with the driving circuit of the first sub-pixel.

7. The display apparatus according to claim 5, wherein the driving circuit of each of the first to fourth sub-pixels includes at least one transistor, and
- wherein a gate electrode of the transistor has a same material as a source electrode and a drain electrode of the transistor.

8. The display apparatus according to claim 7, wherein the data line and the reference voltage supply line have a material different from the gate electrode.

9. The display apparatus according to claim 7, wherein the data connection line and the reference connection line have a same material as the gate electrode.

10. The display apparatus according to claim 5, wherein the driving circuit of each of the first to fourth sub-pixels includes a first transistor, a second transistor, and a third transistor,
- a gate electrode of the first transistor is connected to a gate line supplying a gate signal, a source electrode of the first transistor is connected to the data line, and a drain electrode of the first transistor is connected to a gate electrode of the second transistor, and
- a gate electrode of the third transistor is connected to the gate line, a source electrode of the third transistor is connected to the reference voltage supply line, and a drain electrode of the third transistor is connected to the light-emitting device.

11. The display apparatus according to claim 10, wherein in each of the first and second sub-pixels, the first transistor is arranged between the third transistor and the data line, and wherein in each of the third and fourth sub-pixels, the third transistor is arranged between the first transistor and the power reference voltage supply line.

12. The display apparatus according to claim 1, further comprising:

a power supply line extending in the first direction; and a power distribution line connected to the power supply line, the power distribution line extending in the second direction, wherein the power distribution line crosses the first to fourth sub-pixels.

13. The display apparatus according to claim 12, wherein the power supply line and the power distribution line are disposed on different layers.

14. The display apparatus according to claim 12, wherein the power distribution line has the same material as that of the data connection line and the reference connection line.

* * * * *